United States Patent [19]

Heathman et al.

[11] Patent Number: 5,389,706
[45] Date of Patent: Feb. 14, 1995

[54] WELL CEMENT COMPOSITIONS HAVING IMPROVED PROPERTIES AND METHODS

[75] Inventors: James F. Heathman, Duncan; Roger S. Cromwell, Walters, both of Okla.

[73] Assignee: Halliburton Company, Duncan, Okla.

[21] Appl. No.: 958,985

[22] Filed: Oct. 9, 1992

[51] Int. Cl.⁶ .............................. C08K 3/30; C09K 7/02
[52] U.S. Cl. ........................................ 524/5; 524/157; 523/130; 166/292; 166/293; 166/294; 166/295; 507/231; 507/255
[58] Field of Search .................... 523/130; 252/8.551; 166/292, 293, 295, 294; 524/157, 5

[56] References Cited

U.S. PATENT DOCUMENTS

| | | | |
|---|---|---|---|
| 3,993,134 | 11/1976 | Adams et al. | 166/293 |
| 4,036,660 | 7/1977 | Persinski et al. | 106/90 |
| 4,077,933 | 3/1978 | Burton et al. | 524/574 |
| 4,151,150 | 4/1979 | Peters et al. | 524/8 |
| 4,447,338 | 5/1984 | Lundberg et al. | 252/8.5 M |
| 4,537,918 | 8/1985 | Parcevaux et al. | 523/130 |
| 4,557,763 | 12/1985 | George et al. | 106/90 |
| 4,746,365 | 5/1988 | Babcock et al. | 524/4 |
| 4,849,018 | 7/1989 | Babcock et al. | 106/104 |
| 5,121,795 | 6/1992 | Ewert et al. | 166/292 |

*Primary Examiner*—Paul R. Michl
*Assistant Examiner*—John J. Guarriello
*Attorney, Agent, or Firm*—Robert A. Kent; C. Clark Dougherty, Jr.

[57] ABSTRACT

Improved cement compositions and methods of using such compositions in carrying out construction and remedial operations in oil and gas wells at high temperatures are provided. The compositions are basically comprised of hydraulic cement, sufficient water to form a pumpable slurry, and a dispersing and stabilizing additive comprised of an ethoxylated alkali metal salt of an alkyl polyether sulfonate.

5 Claims, No Drawings

WELL CEMENT COMPOSITIONS HAVING IMPROVED PROPERTIES AND METHODS

BACKGROUND OF THE INVENTION

1. Field of the Invention

This invention relates to well cement compositions having improved properties and methods, and more particularly, to cement compositions for constructing and repairing wells having improved properties such as acid solubility resistance at high temperatures and methods of using such compositions.

2. Description of the Prior Art

In carrying out completion and remedial operations in oil, gas and water wells, hydraulic cement compositions are commonly utilized. For example, hydraulic cement compositions are used in primary cementing operations during the construction of a well. Primary cementing involves the placement of a water slurry of a hydraulic cement into the annular space between the walls of the well bore and the exterior of a pipe such as casing disposed therein. The cement is permitted to set in the annular space thereby forming an annular sheath of hardened impermeable cement therein. The objective of the cement sheath is to physically support and position the pipe in the well bore and bond the pipe to the walls of the well bore whereby undesirable migration of fluids between zones or formations penetrated by the well bore is prevented.

In the operation of wells after primary cementing and other completion operations have been accomplished and produced fluids have been recovered from one or more subterranean formations penetrated by the well bore, problems relating to the undesirable flow of fluids with or without fine solids into or from undesirable locations in subterranean formations or the well bore often occur. The undesirable passage of fluids and/or fine solids can severely disrupt or terminate the operation of a well. Ordinarily, the undesirable passage of fluids involves the movement of oil, gas or water through small holes or cracks in the well casing; holes, cracks, voids or channels in the annular cement sheath between the casing and the walls of the well bore; very small spaces, called microannuli, between the annular cement sheath and the exterior surface of the casing or the walls of the formation; and permeable zones or fractures in gravel packs and/or subterranean formations. The problems of undesirable fluids passing through such openings are not unique, and the solutions have traditionally involved the placement of hydraulic cement compositions in the openings followed by permitting the cement compositions to harden and form impermeable plugs therein. These remedial techniques are generally referred to in the art as squeeze cementing techniques.

The success of squeeze cementing techniques whereby a water slurry containing hydraulic cement particles is squeezed into small openings is often a function of the size of the openings relative to the particle size of the cement as well as the overall properties of the slurry. If the particle size of the cement is greater than the openings, the cement cannot enter the openings and plugs therein will not result. Other properties of the cement slurry which affect the success or failure of primary and squeeze cementing techniques include fluid loss from the cement slurry and the time in which the slurry sets, i.e., the rate at which water is lost from the slurry as it contacts permeable zones in subterranean formations and the time after the cement slurry has been prepared before it thickens and sets during which the cement slurry must be placed in a desired location in a well.

When a well contains acid as a result of being stimulated with a fluid containing acid or other reason, or the fluids of the formations penetrated by the well bore are of a corrosive nature, the success or failure of cementing completion and remedial operations in the well can depend on the acid resistance of the hydraulic cement composition, both before and after the cement composition hardens into a solid mass.

Heretofore, methods of performing completion and remedial cementing operations in oil and gas wells have been developed wherein the hydraulic cement slurries used contain fine cement particles. For example, squeeze cementing methods which utilize hydraulic cement consisting of discreet particles having a particle size no greater than about 30 microns are disclosed in U.S. Pat. No. 5,121,795 issued Jun. 16, 1992, and primary cementing methods utilizing such hydraulic cement are disclosed in U.S. Pat. No. 5,125,455 issued on Jun. 30, 1992. The fine particle size hydraulic cement compositions described in the above patents can readily enter very small openings, can be formulated utilizing low ratios of water to cement, produce set cements having high compressive strengths, have low heats of hydration, expand upon setting and have other properties which are highly beneficial in conducting well cementing operations.

A variety of hydraulic cement slurry set retarding additives have been developed which can be utilized in hydraulic cement slurries of both normal cement particle size and ultra fine cement particle size to provide sufficient time between slurry formation and placement to conduct well cementing operations. Various hydraulic cement slurry fluid loss control additives have also heretofore been developed and used which are well known to those skilled in the art. However, in well cementing applications wherein the hydraulic cement is subjected to acid attack at relatively high temperatures, satisfactory acid resistant cement compositions and methods have not been available. Thus, there is a need for improved well completion and remedial cementing compositions and methods wherein the compositions have good acid solubility resistance as well as other required properties.

Also, a variety of dispersing agents have been developed and used heretofore which facilitate the preparation of well cement compositions, i.e., improve the mixability of the particulate solid cement with water and other cement composition components. While such dispersing agents have achieved varying degrees of success, there is still a need for improved cement composition mixability, especially in the preparation of cement compositions having low water to cement ratios.

SUMMARY OF THE INVENTION

The present invention provides hydraulic cement compositions having improved properties, e.g., improved mixability, improved acid resistance, low fluid loss and others, and methods of using such compositions which meet the needs described above and overcome the shortcomings of the prior art. The cement compositions are basically comprised of a particulate hydraulic cement of either normal or very fine particle size, or combinations of both, sufficient water to form a pumpable slurry and a dispersing and stabilizing additive which imparts excellent mixability and stability thereto. A particularly preferred such composition is comprised of particulate hydraulic cement, sufficient water to form a pumpable slurry, a styrene-butadiene copolymer latex emulsion to provide acid solubility resistance and low fluid loss properties to the composition and the above mentioned dispersing and stabilizing additive. The dispersing and stabilizing additive provides excellent mixability to the composition and stabilizes the composition whereby the latex emulsion is prevented from inverting at the well conditions encountered. Such inversion can cause the cement composition to lose its acid resistance and/or fluid loss properties. Also, the presence of the dispersing and stabilizing additive prevents the cement composition from prematurely gelling and/or otherwise disfunctioning.

The dispersing and stabilizing additive is comprised of an ethoxylated alkali metal salt of an alkyl polyether sulfonate wherein the alkyl substituents contain from about 12 to about 15 carbon atoms and wherein the alkyl polyether sulfonate contains an average of from about 2 to about 50 moles of ethylene oxide per mole thereof. The ethoxylated alkyl polyether sulfonate is normally dissolved in an aqueous solvent in an amount in the range of from about 20 parts to about 40 parts per 100 parts by weight of solution.

The cement compositions of this invention can also contain other additives including set retarding additives, fluid loss control additives and other well cement additives well known to those skilled in the art.

The above described improved hydraulic cement compositions are utilized in accordance with the methods of this invention for carrying out completion and remedial operations in oil, gas and water wells including those wells wherein the cement compositions are subjected to high temperatures. The methods basically comprise the steps of placing a cement composition of this invention in a zone in a well to be cemented, and then maintaining the cement composition in the zone for a time sufficient for it to set into a hard impermeable mass therein.

It is, therefore, a general object of the present invention to provide hydraulic cement compositions having improved properties and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, the improved hydraulic cement compositions of the present invention which are advantageously utilized for performing construction and remedial operations in oil and gas wells at high temperatures are comprised of a particulate hydraulic cement, sufficient water to form a pumpable slurry and a dispersing and stabilizing additive. The compositions also preferably include a styrene-butadiene copolymer latex emulsion to provide acid resistance and low fluid loss thereto. The term "high temperatures" is used herein to mean temperatures up to 425° F. and higher. The cement compositions have low solubility in acid and when particular set retarding additives and fluid loss control additives are included therein, the compositions have excellent fluid loss properties and predictable extended thickening and set times.

The particulate hydraulic cement utilized in the compositions of this invention can be any of a variety of hydraulic cements both of normal particle size and fine particle size. Portland cement is generally preferred and can be, for example, one or more of the various Portland cements designated as API Classes A - H and J cements. These cements are identified and defined in the *API Specification for Materials and Testing for Well Cements*, API Specification 10, of the American Petroleum Institute. API Portland cements generally have a maximum particle size of about 90 microns and a specific surface (sometimes referred to as Blaine Fineness) of about 3,900 square centimeters per gram.

It is often highly advantageous to use a fine particle size hydraulic cement consisting of particles having diameters no larger than about 30 microns and having a Blaine Fineness no less than about 6,000 square centimeters per gram. Preferably, the cement particles have diameters no larger than about 17 microns and most preferably no larger than about 11 microns. The distribution of various size particles within the fine cementitious material, i.e., the particle size distribution, is preferably such that 90% of the particles have diameters no greater than about 25 microns, preferably about 10 microns and still more preferably about 7 microns; 50% have diameters no greater than about 10 microns, preferably about 6 microns and still more preferably about 4 microns; and 20% of the particles have diameters no greater than about 5 microns, preferably about 3 microns and still more preferably about 2 microns. The Blaine Fineness of the hydraulic cement, which is an indication of the ability of the cement to chemically interact with other materials, is preferably greater than about 7,000 square centimeters per gram, more preferably about 10,000 centimeters per gram and still more preferably greater than about 13,000 centimeters per gram.

Cementitious materials of particle size and fineness as set out above are disclosed in various prior U.S. patents including U.S. Patent No. 4,761,183 to Clark which discloses fine particle size cement formed of slag and mixtures thereof with Portland cement, and U.S. Pat. No. 4,160,674 to Sawyer which discloses fine particle size Portland cement. The fine particle size hydraulic cement preferred for use in accordance with this invention is Portland cement and combinations thereof with slag wherein the quantity of Portland cement in the mixture is preferably no less than about 40% by weight, more preferably about 60% and most preferably about 80%. The most preferred fine particle size hydraulic cement is comprised of 100% Portland cement. As mentioned above, methods of utilizing fine particle size hydraulic cement in well completion and remedial operations are disclosed in U.S. Pat. Nos. 5,121,795 issued Jun. 16, 1992 and 5,125,455 issued Jun. 30, 1992, both of which are incorporated herein by reference.

The water slurries of hydraulic cement useful herein are formed using a quantity of water sufficient to form a pumpable slurry of desired density. When utilizing API Portland cements of normal particle size, the weight ratio of water to cement generally falls within the range of from about 0.2 pound to about 1.5 pounds of water per pound of cement. When utilizing the fine particle size cements described above, the ratio of water to cement is generally in the range of from about 0.5 pound to about 5 pounds of water per pound of cement, preferably from about 1 pound to about 1.75 pounds of water per pound of cement.

The dispersing and stabilizing additive of this invention is an anionic surfactant which is comprised of an ethoxylated alkali metal salt of an alkyl polyether sulfonate wherein the alkyl substituents contain from about 12 to about 15 carbon atoms and wherein the alkyl polyether sulfonate contains an average in the range of from about 2 moles to about 50 moles of ethylene oxide per mole thereof. The ethoxylated alkyl polyether sulfonate is dissolved in an aqueous solvent in an amount in the range of from about 20 parts to about 40 parts per 100 parts by weight of solution. A particularly preferred surfactant solution dispersant and stabilizer for use in accordance with this invention is comprised of a sodium alkyl polyether sulfonate ethoxylated with an average of about 40 moles of ethylene oxide per mole dissolved in an aqueous solvent in an amount of about 33 parts per 100 parts by weight of the solution. Such an aqueous surfactant solution is commercially available under the trade designation Avanel ™ S-400 from PPG Industries, Inc. of Gurnee, Ill.

The dispersing and stabilizing additive is generally included in a cement composition of this invention in an amount within the range of from about 0.001 gallon to about 0.2 gallon of the additive per pound of cement in the cement composition.

When included, the latex component of the cement compositions of this invention provides the acid solubility resistance and low fluid loss properties described above. While various latexes can be utilized, those prepared by emulsion polymerization processes are preferred. A particularly preferred latex for use in accordance with this invention is a styrene-butadiene copolymer latex emulsion prepared by emulsion polymerization. The aqueous phase of the emulsion produced is an aqueous colloidal dispersion of the styrene-butadiene copolymer. Preferably, the copolymer has a styrene to butadiene weight ratio of from about 30:70 to about 70:30 and is present in the emulsion in an amount in the range of from about 45 parts to about 55 parts per 100 parts by weight of emulsion. A particularly suitable such styrene-butadiene latex emulsion is commercially available under the trade designation LATEX-2000 ™ from the Halliburton Company of Duncan, Okla.

The styrene-butadiene copolymer latex emulsion is preferably present in a cement composition of this invention in an amount in the range of from about 0.01 gallon to about 0.2 gallon of emulsion per pound of cement in the composition, most preferably in an amount in the range of from about 0.01 gallon to about 0.1 gallon per pound of cement. As mentioned, the presence of the styrene-butadiene copolymer latex emulsion in the cement composition provides acid resistance thereto, i.e., the latex emulsion coats the cement particles whereby less than about 10% by weight of set cement dissolves in strong mineral acid during contact therewith for a period of about 1 hour. However, if the latex emulsion inverts as a result of being exposed to high temperature conditions in a well or being exposed to reactive components in the well or in the cement composition, or both, the cement composition can prematurely gel whereby it can not achieve its intended function and/or the acid solubility resistance and fluid loss properties of the composition can be lost.

The above described dispersing and stabilizing additive prevents the inversion of the styrene-butadiene copolymer latex emulsion in a cement composition. The additive is included in the composition in an amount sufficient to prevent the latex emulsion from inverting at the temperature and other well conditions encountered, generally an amount within the range mentioned above. As previously mentioned, in addition to functioning as the latex emulsion stabilizer, the additive imparts various other desirable properties to cement compositions, especially high density compositions, including ease of mixing, i.e., solids and immiscible liquids are readily dispersed in the water, and lower composition viscosities are obtained than would otherwise result. In some extremely difficult compositions such as those including fine particle size cement and a relatively low ratio of mixing water to cement, the presence of the dispersing and stabilizing additive can allow the composition to be prepared in an economical manner and reasonable time which otherwise could not be accomplished.

A particularly preferred cement composition of the present invention for use in carrying out completion and remedial operations in wells at temperatures up to 425° F. and higher is comprised of hydraulic cement, sufficient water to form a pumpable slurry, a latex emulsion comprised of a styrene-butadiene copolymer having a styrene to butadiene weight ratio of from about 30:70 to about 70:30 dispersed in the emulsion in an amount in the range of from about 45 parts to about 55 parts per 100 parts by weight of emulsion present in the cement composition in an amount in the range of from about 0.01 gallon to about 0.2 gallon per pound of cement therein, and a dispersing and stabilizing additive comprised of an alkali metal salt of an alkyl polyether sulfonate wherein the alkyl substituents contain from about 12 to about 15 carbon atoms ethoxylated with an average of about 20 to 45 moles of ethylene oxide per mole dissolved in an aqueous solvent in an amount of about 33 parts per 100 parts by weight of solution present in the cement composition in an amount in the range of from about 0.001 gallon to about 0.2 gallon per pound of cement therein.

While the hydraulic cement utilized in the above composition can be of normal particle size or fine particle size, a fine particle size hydraulic cement is preferably utilized having particles of a size no greater than about 30 microns and having a Blaine Fineness no less than about 6,000 square centimeters per gram. The amount of water utilized with such cement is generally in the range of from about 0.5 pound to about 5 pounds of water per pound of fine cement in the composition. Preferably, water is present in an amount in the range of from about 1 to about 1.75 pounds of water per pound of fine cement.

When the cement composition contains fine particle size cement and is to be used in well environments at temperatures up to about 425° F. and higher, an additional fluid loss control additive is preferably included in the composition. While various fluid loss control additives can be used, a preferred such additive which has both dispersing and fluid loss control properties is comprised of a mixture of two polymers. That is, the fluid loss control additive is comprised of about 90% by weight of a first polymer prepared by the caustic-catalyzed condensation of formaldehyde with acetone or a substance derived from acetone, wherein the polymer contains sodium sulfonate groups in an amount sufficient to render the polymer water soluble, and about 10% by weight of a second polymer selected from the group consisting of hydroxyethylcellulose, carboxymethylhydroxyethylcellulose, copolymers of N,N-dimethylacrylamide and 2-acrylamido, 2-methyl propane sulfonic acid and copolymers of 2-acrylamido, 2-methyl propane sulfonic acid and acrylamide. The fluid loss control additive comprised of the two polymers is generally combined with a cement composition of this invention in an amount in the range of from about 1% to about 3% by weight of cement in the cement composition. A particularly preferred fluid loss control additive is comprised of about 90% by weight of the above-described first polymer and about 10% by weight of a hydroxyethylcellulose second polymer.

The preferred fluid loss control additives described above are disclosed in U.S. Pat. No. 4,557,763 issued Dec. 10, 1985, and they are commercially available under the trade designation HALAD ®-322 from the Halliburton Company of Duncan, Okla.

As mentioned above, the cement compositions can include other additives which are well known to those skilled in the art including set retarding additives, silica flour to prevent compressive strength retrogression, defoaming additives, formation conditioning additives and others. Generally, set retarding additives are included when it is necessary to extend the times in which the cement compositions can be pumped so that they will not thicken or set prior to being placed in desired locations in wells. While various set retarding additives can be utilized, a preferred set retarding additive for use when fine particle size cement is utilized in the cement composition is comprised of about 50% by weight aqueous solution of a methylenephosphonic acid derivative selected from the group consisting of aminotri(methylenephosphonic acid), diethylenetriaminepenta(methylenephosphonic acid), hexamethylenediaminetetra(-methylenephosphonicacid)and 1-hydroxyethylidene-1, 1-diphosphonic acid. Of these the most preferred set retarder for use in accordance with this invention is an about 50% by weight aqueous solution of aminotri(methylenephosphonic acid). The set retarder is generally included in the cement composition in an amount in the range of from about 0.0008 gallon to about 0.005 gallon per pound of cement in the composition.

The cement compositions of this invention are prepared by first mixing the dispersing and stabilizing additive and latex emulsion, if used, with the water used followed by mixing other liquid additives therewith followed by mixing solid additives and particulate hydraulic cement therewith.

The above-described cement compositions are utilized in accordance with the methods of this invention for carrying out completion and remedial operations in wells at high temperatures by placing a composition in a zone in a well to be cemented and maintaining the composition in the zone for a time sufficient for the cement composition to set into a hard impermeable mass therein. The placement of the cement composition is generally accomplished by pumping the composition through the well bore and into the zone to be cemented using techniques and apparatus such as packers and the like which are well known to those skilled in the art.

In order to further illustrate the improved cement compositions and methods of this invention, the following examples are given.

EXAMPLE

A base cement slurry was prepared utilizing a fine particle size Portland hydraulic cement, sufficient water to form a pumpable slurry having a density of 12 pounds per gallon, 0.15 gallons of a commercial liquid defoamer per 50 pound sack of cement, 2 gallons of the above-described styrene-butadiene copolymer latex emulsion per 50 pound sack of cement, potassium chloride in an amount of 1% by weight of the water used and the above-described HALAD ®-322 fluid loss control additive in an amount of 3% by weight of dry cement utilized. The above-described methylenephosphonic acid derivative set retarder and the dispersing and stabilizing additive of this invention were added to test portions of the base slurry in the amounts shown in the table below. Thickening time tests were conducted using the test slurries in general accordance with the procedures (modified as noted) set forth in *API Specification for Materials and Testing for Well Cements*, API Specification 10, published by the American Petroleum Institute, Washington, D.C.

TABLE

Performance Testing of Acid Resistant Cement Compositions

| Test Slurry No. | Quantity of Latex Emulsion Stabilizer[1], Gallon/Sack[4] of Cement | Quantity of Set Retarder[2], Gallon/Sack of Cement | Thickening Time (70 $B_c$)[3], Hours:Minutes |
|---|---|---|---|
| 1 | 0.4 | 0.06 | 4:30 |
| 2 | 0.8 | 0.06 | 5:00 |
| 3 | 0.8 | 0.08 | —(Gelled) |
| 4 | 0.8 | 0.08 | 4:24 |
| 5 | 0.8 | 0.15 | 3:30 |
| 6 | 0.8 | 0.04 | 3:20 |
| 7 | 1.5 | 0.10 | 5:24 |
| 8 | 1.5 | 0.15 | 6:00 |
| 9 | 0.8 | 0.06 | 4:52 |
| 10 | 1.3 | 0.10 | 6:00 |
| 11[5] | 1.3 | 0.10 | 4:47 |
| 12 | 1.3 | 0.12 | 6:10 |
| 13[5] | 1.3 | 0.15 | 6:25 |
| 14[5,6] | 1.3 | 0.15 | 4:32(Gelled) |
| 15[5,6] | 1.3 | 0.18 | 4:28(Gelled) |
| 16[5,6] | 1.5 | 0.15 | 4:20 |
| 17[5,6] | 1.5 | 0.18 | 8:15 |
| 18[7] | 1.5 | 0.10 | 9:00 |

[1] Avanel ™ S-400 sodium alkyl polyether sulfonate with average of 40 moles E.O.
[2] 50% by weight aqueous solution of aminotri(methylene-phosphonic acid).
[3] Thickening time tests included 2 hours of conditioning at 500 psi pressure and 80° F. followed by increasing the temperature at 4° F. per minute to final temperature of 200° F.
[4] 50 pound sack of cement.
[5] Tested with new sample of cement.
[6] Tested with new sample of stabilizer.
[7] Cement composition modified to include 40% by weight Micro Sand ™ (silica flour) to prevent strength retrogression, styrene-butadiene latex emulsion (LATEX 2000 ™) increased to 2.10 gallon/sack and fluid loss additive (HALAD ®-322) increased to 3.2% by weight. The acid solubility of set sample was 8.2% by volume and the 72 hour compressive strength was 1580 psi.

Portions of each of the test slurries were allowed to harden and were tested for 48 hour compressive strengths at 200° F. in accordance with API procedures set forth in the above-described specification. The compressive strength results obtained for the test slurries all fell within the range of from 900 psi to 1600 psi. In addition, portions of the set cement slurries were tested for acid solubility at 200° F. by immersing 2" cubes of the cement in an aqueous acid solution containing 12% by weight hydrochloric acid and 3% by weight hydrofluoric acid for 1 hour. The solubilities measured as percent weight loss all fell within the range of from 7.6% to 10%. Thus, the cement compositions of this invention have good acid resistances and compressive strengths as well as predictable set times.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a well comprising the steps of:

placing an aqueous cement composition in a zone in said well to be cemented; and maintaining said cement composition in said zone for a time sufficient for said cement composition to set into a hard impermeable mass therein;

wherein said cement composition is comprised of a particulate Portland cement, sufficient water to form a pumpable slurry and a dispersing and stabilizing additive comprised of an ethoxylated alkali metal salt of an alkyl polyether sulfonate wherein the alkyl substituents contain from about 12 to about 15 carbon atoms and wherein said salt contains an average in the range of about 20 to about 40 moles of ethylene oxide per mole thereof, said ethoxylated alkyl polyether sulfonate being dissolved in an aqueous solvent in an amount in the range of from about 20 parts to about 40 parts per 100 parts by weight of solution.

2. The method of claim 1 wherein said dispersing and stabilizing additive is present in said composition in an amount in the range of from about 0.001 gallon to about 0.2 gallon per pound of cement in said composition.

3. The method of claim 1 wherein said cement composition further comprises a styrene-butadiene copolymer latex emulsion present in an amount of about 0.01 gallons to about 0.2 gallons per pound of cement in said composition.

4. The method of claim 3 wherein said styrene-butadiene copolymer in said latex emulsion has a styrene to butadiene weight ratio of from about 30:70 to about 70:30 and is dispersed in said emulsion in an amount in the range of from about 45 parts to about 55 parts per 100 parts by weight of emulsion.

5. The method of claim 3 wherein said dispersing and stabilizing additive is sodium alkyl polyether sulfonate ethoxylated with an average of about 40 moles of ethylene oxide per mole dissolved in an aqueous solvent in an amount of about 33 parts per 100 parts by weight of solution.

* * * * *